(12) United States Patent
Maekawa

(10) Patent No.: US 7,602,386 B2
(45) Date of Patent: Oct. 13, 2009

(54) REFERENCE CLOCK SIGNAL GENERATION CIRCUIT, POWER SUPPLY CIRCUIT, DRIVER CIRCUIT, AND ELECTRO-OPTICAL DEVICE

(75) Inventor: Kazuhiro Maekawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 684 days.

(21) Appl. No.: 11/436,035

(22) Filed: May 18, 2006

(65) Prior Publication Data

US 2006/0267901 A1 Nov. 30, 2006

(30) Foreign Application Priority Data

May 31, 2005 (JP) ............... 2005-159516

(51) Int. Cl.
*G09F 3/08* (2006.01)
*G09G 5/00* (2006.01)
*H03L 3/00* (2006.01)
*H03K 21/00* (2006.01)
*H03K 25/00* (2006.01)
*H03L 7/00* (2006.01)

(52) U.S. Cl. ............ 345/204; 345/211; 345/212; 345/213; 327/115; 327/116; 327/119; 327/148; 327/152; 327/291

(58) Field of Classification Search .......... 345/98–100, 345/211–213; 331/107; 327/115–119, 141–163, 327/291

See application file for complete search history.

(56) References Cited

U.S. PATENT DOCUMENTS

| 4,670,799 A * | 6/1987 | Ogura et al. .................. 360/66 |
| 6,259,293 B1 * | 7/2001 | Hayase et al. ............... 327/276 |
| 6,727,681 B2 * | 4/2004 | Morita ........................ 323/282 |
| 2002/0167510 A1 * | 11/2002 | Matsumoto ................ 345/211 |
| 2003/0204766 A1 * | 10/2003 | Akasaka et al. ............ 713/500 |
| 2005/0127962 A1 * | 6/2005 | Furuya ........................ 327/156 |

FOREIGN PATENT DOCUMENTS

JP A-2003-102165 4/2003

\* cited by examiner

*Primary Examiner*—David L Lewis
*Assistant Examiner*—Benyam Ketema
(74) *Attorney, Agent, or Firm*—Oliff & Berridge PLC

(57) ABSTRACT

A reference clock signal generation circuit for generating a reference clock signal for a charge-pump operation which raises or lowers a voltage includes a clock signal generation circuit which generates a reference clock signal having one of first to nth (n is an integer of two or more) frequencies, a wait time setting register in which a value corresponding to a wait time is set, and a frequency setting register in which a value corresponding to one of the first to nth frequencies is set. The clock signal generation circuit generates the reference clock signal having a predetermined frequency in a start period from start of the charge-pump operation to completion of the wait time, and generates the reference clock signal having a frequency corresponding to the value set in the frequency setting register in an operation period after the start period.

12 Claims, 15 Drawing Sheets

US 7,602,386 B2

REFERENCE CLOCK SIGNAL GENERATION CIRCUIT, POWER SUPPLY CIRCUIT, DRIVER CIRCUIT, AND ELECTRO-OPTICAL DEVICE

Japanese Patent Application No. 2005-159516 filed on May 31, 2005, is hereby incorporated by reference in its entirety.

BACKGROUND OF THE INVENTION

The present invention relates to a reference clock signal generation circuit, a power supply circuit, a driver circuit, and an electro-optical device.

When driving an electro-optical device such as a liquid crystal display panel, it is necessary to generate various power supply voltages depending on the material for the electro-optical element and the drive method. The power supply voltages are generated by a power supply circuit. The power supply circuit generates the power supply voltages by raising or lowering a system power supply voltage.

The power supply circuit may include a charge-pump circuit which raises or lowers voltage by a charge-pump operation. The charge-pump circuit can efficiently generate a voltage raised or lowered in the positive or negative direction at a low power consumption by the charge-pump operation using a switch device. The charge-pump circuit requires a switch control signal (reference clock signal, step-up clock signal, or step-down clock signal) for controlling the switch device. The frequency of the switch control signal is generally variable, and the output capability of the charge-pump circuit can be increased by increasing the frequency of the switch control signal. However, power consumption is increased by increasing the frequency of the switch control signal.

JP-A-2003-102165 discloses technology relating to a power supply circuit including a charge-pump circuit which allows quick power-on startup and achieves an increase in efficiency and a reduction in power consumption, for example.

In the technology disclosed in JP-A-2003-102165, a circuit which supplies voltage to a controller which generates a switch control signal is switched from a series regulator to a charge-pump circuit in a start period immediately after providing a system power supply and the subsequent operation period.

The specification of a power supply circuit including a charge-pump circuit generally provides a long power-on start period taking the load, manufacturing variation, and the like into consideration. The output capability of the power supply circuit is necessary in the start period. If the charge-pump circuit is operated in the subsequent operation period using the frequency of the switch control signal used in the start period, unnecessary power consumption occurs. As a result, when the power supply circuit is provided in a battery-driven electronic instrument, the battery life is decreased.

When a high output capability is unnecessary for the power supply circuit in the operation period, the user must set the frequency of the switch control signal in the start period taking into consideration the period provided in the specification, and set the frequency of the switch control signal in the operation period at a lower frequency. Therefore, the size of firmware provided by the user or the like for controlling the switch control signal is increased.

Moreover, the actual start period of the power supply circuit is unknown when allowing the user to set the frequency of the switch control signal, whereby it may be difficult to determine whether a malfunction is caused by the user's setting or by a malfunction of the power supply circuit.

SUMMARY

A first aspect of the invention relates to a reference clock signal generation circuit for generating a reference clock signal for a charge-pump operation which raises or lowers a voltage, the reference clock signal generation circuit comprising:

a clock signal generation circuit which generates a reference clock signal having one of first to nth (n is an integer of two or more) frequencies;

a wait time setting register in which a value corresponding to a wait time is set; and a frequency setting register in which a value corresponding to one of the first to nth frequencies is set;

the clock signal generation circuit generating the reference clock signal having a predetermined frequency in a start period from start of the charge-pump operation to completion of the wait time, and generating the reference clock signal having a frequency corresponding to the value set in the frequency setting register in an operation period after the start period.

A second aspect of the invention relates to a power supply circuit for raising or lowering an input voltage, the power supply circuit comprising:

the above reference clock signal generation circuit; and one or more switch devices switch-controlled based on the reference clock signal generated by the reference clock signal generation circuit;

the power supply circuit raising or lowering the input voltage by a charge-pump operation using a capacitor connected with the one or more switch devices.

A third aspect of the invention relates to a driver circuit for driving an electro-optical device including a plurality of scan lines, a plurality of data lines, and pixel electrodes specified by the scan lines and the data lines, the driver circuit comprising:

the above power supply circuit; and an output buffer which supplies a voltage generated based on a voltage from the power supply circuit corresponding to grayscale data to the data line.

A fourth aspect of the invention relates to an electro-optical device comprising:

a plurality of scan lines;
a plurality of data lines;
a plurality of pixel electrodes;
a scan line driver circuit which scans the scan lines; and
the above driver circuit which drives the data lines.

DETAILED DESCRIPTION OF THE EMBODIMENT

Figure 1:
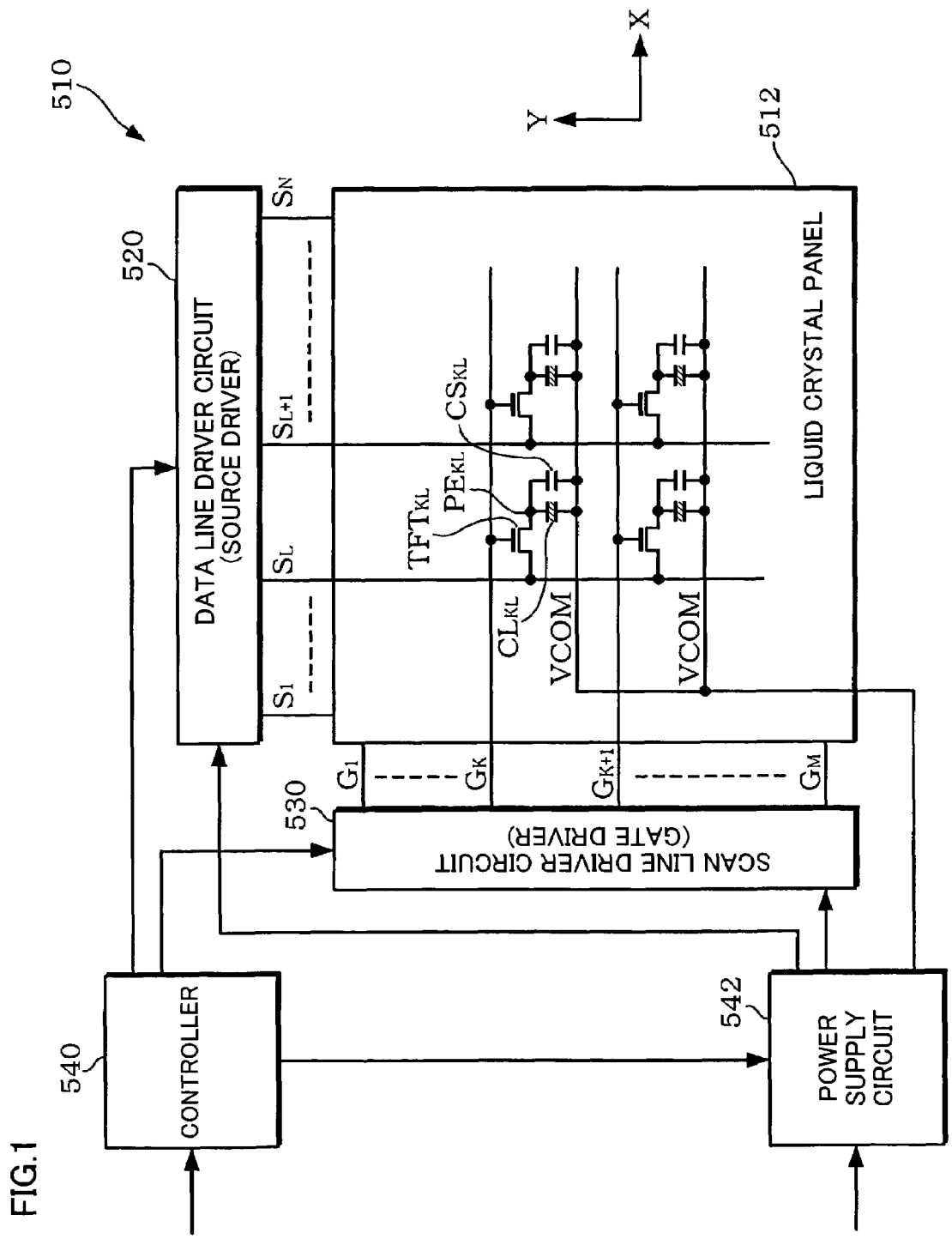
FIG. 1 is a block diagram of a configuration example of a display device including an electro-optical device according to one embodiment of the invention.

The invention may provide a reference clock signal generation circuit, a power supply circuit, a driver circuit, and an electro-optical device which can reduce power consumption in a start period using a simple configuration.

One embodiment of the invention relates to a reference clock signal generation circuit for generating a reference clock signal for a charge-pump operation which raises or lowers a voltage, the reference clock signal generation circuit comprising:

a clock signal generation circuit which generates a reference clock signal having one of first to nth (n is an integer of two or more) frequencies;

a wait time setting register in which a value corresponding to a wait time is set; and a frequency setting register in which a value corresponding to one of the first to nth frequencies is set;

the clock signal generation circuit generating the reference clock signal having a predetermined frequency in a start period from start of the charge-pump operation to completion of the wait time, and generating the reference clock signal having a frequency corresponding to the value set in the frequency setting register in an operation period after the start period.

In the reference clock signal generation circuit according to this embodiment, the clock signal generation circuit may include: a frequency divider circuit which divides a frequency of an input clock signal and generates first to nth frequency-divided clock signals respectively having the first to nth frequencies; and a select circuit which selects and outputs one of the first to nth frequency-divided clock signals as the reference clock signal; and the select circuit may output the kth ($1 \leq k \leq n$, k is an integer) frequency-divided clock signal in the start period as the reference clock signal having a predetermined frequency, and may output the jth ($1 \leq j \leq n$, j is an integer excluding k) frequency-divided clock signal in the operation period as the reference clock signal having a frequency corresponding to the value set in the frequency setting register.

According to the above embodiment, the frequency of the reference clock signal can be caused to differ in the start period and the operation period after the start period regardless of the value set in the frequency setting register. Therefore, the output capability in the start period can be caused to differ from the output capability in the operation period regardless of the value set in the frequency setting register. Therefore, the reference clock signal having a minimum design frequency can be generated in the start period. It suffices that the user to set the frequency of the reference clock signal corresponding to the load in the frequency setting register, whereby the frequency of the reference clock signal is not unnecessarily increased. As a result, power consumption can be reduced while maintaining the output capability of the power supply circuit.

In the reference clock signal generation circuit according to this embodiment, the frequency of the kth frequency-divided clock signal may be higher than the frequency of the jth frequency-divided clock signal.

According to this embodiment, the output capability in the start period can be increased in comparison with the output capability in the operation period, and the power consumption of a power supply circuit in the operation period can be reduced.

Another embodiment of the invention relates to a power supply circuit for increasing or decreasing an input voltage, the power supply circuit comprising:

the above reference clock signal generation circuit; and one or more switch devices switch-controlled based on the reference clock signal generated by the reference clock signal generation circuit;

the power supply circuit raising or lowering the input voltage by a charge-pump operation using a capacitor connected with the one or more switch devices.

According to this embodiment, the output capability in the start period, in which it is necessary to raise the output voltage to a specific voltage by the charge-pump operation, can be increased in comparison with the output capability in the operation period, and the power consumption of the power supply circuit can be reduced.

Another embodiment of the invention relates to a driver circuit for driving an electro-optical device including a plurality of scan lines, a plurality of data lines, and pixel electrodes specified by the scan lines and the data lines, the driver circuit comprising:

the above power supply circuit; and an output buffer which supplies a voltage generated based on a voltage from the power supply circuit corresponding to grayscale data to the data line.

The driver circuit according to this embodiment may comprise: a partial display period setting register in which a partial display area designated in units of the scan lines is set; wherein the reference clock signal generation circuit may output a clock signal having the pth ($1 \leq p \leq n$, p is an integer) frequency as the reference clock signal in a partial display area scan period in the operation period, and output a clock signal having the qth ($1 \leq q \leq n$, q is an integer excluding p) frequency as the reference clock signal in a partial non-display area scan period in the operation period; and wherein the pth frequency may be higher than the qth frequency.

The driver circuit according to this embodiment may comprise: a data line drive period setting register for designating a data line drive period in one horizontal scan period; and a scan line select period setting register for designating a scan line select period in one horizontal scan period; wherein the reference clock signal generation circuit may output a clock signal having the rth ($1 \leq r \leq n$, r is an integer) frequency as the reference clock signal in a display period in one horizontal scan period of the operation period determined based on the data line drive period setting register and the scan line select period setting register, and output a clock signal having the sth ($1 \leq s \leq n$, s is an integer excluding r) frequency as the reference clock signal in a blanking period in the horizontal scan period of the operation period; and wherein the rth frequency may be higher than the sth frequency.

The driver circuit according to this embodiment may comprise: a reference clock signal recovery setting register in which a value corresponding to time at which the frequency of the reference clock signal is recovered from the frequency in the blanking period is set; wherein, when time corresponding to the value set in the reference clock signal recovery time setting register has elapsed in the blanking period, the reference clock signal generation circuit may output the clock signal having the rth frequency as the reference clock signal.

According to the above embodiment, a driver circuit which prevents deterioration of a display image and reduces power consumption can be provided.

A further embodiment of the invention relates to an electro-optical device comprising:

a plurality of scan lines;
a plurality of data lines;
a plurality of pixel electrodes;
a scan line driver circuit which scans the scan lines; and
the above driver circuit which drives the data lines.

According to this embodiment, an electro-optical device including a driver circuit which prevents deterioration of a display image and reduces power consumption can be provided.

The embodiments of the present invention are described below in detail with reference to the drawings. Note that the embodiments described below do not in any way limit the scope of the invention laid out in the claims. Note that all elements of the embodiments described below should not necessarily be taken as essential requirements for the invention.

1. Electro-Optical Device

FIG. 1 is a block diagram of a configuration example of a display device including an electro-optical device according to one embodiment of the invention. The display device shown in FIG. 1 includes a driver circuit (data line driver circuit in FIG. 1) to which an reference clock signal generation circuit according to this embodiment is applied, and realizes the function of a liquid crystal device. The electro-optical device according to this embodiment realizes the function of a liquid crystal panel.

A liquid crystal device 510 (display device in a broad sense) includes a liquid crystal panel 512 (display panel in a broad sense), a data line driver circuit 520 (source driver in a narrow sense), a scan line driver circuit 530 (gate driver in a narrow sense), a controller 540, and a power supply circuit 542. The liquid crystal device 510 need not necessarily include all of these circuit blocks. The liquid crystal device 510 may have a configuration in which at least one of these circuit blocks are omitted.

The liquid crystal panel 512 includes a plurality of scan lines (gate lines in a narrow sense), a plurality of data lines (source lines in a narrow sense), and pixel electrodes specified by the scan lines and the data lines. In this case, an active matrix type liquid crystal device may be formed by connecting a thin film transistor TFT (switching device in a broad sense) with the data line and connecting the pixel electrode with the thin film transistor TFT.

In more detail, the liquid crystal panel 512 is formed on an active matrix substrate (e.g. glass substrate). A plurality of scan lines $G_1$ to $G_M$ (M is a natural number of two or more), arranged in a direction Y shown in FIG. 1 and extending in a direction X, and a plurality of data lines $S_1$ to $S_N$ (N is a natural number of two or more), arranged in the direction X and extending in the direction Y, are disposed on the active matrix substrate. A thin film transistor $TFT_{KL}$ (switching device in a broad sense) is provided at a position corresponding to the intersecting point of the scan line $G_K$ ($1 \leq K \leq M$, K is a natural number) and the data line $S_L$ ($1 \leq L \leq N$, L is a natural number).

A gate electrode of the thin film transistor $TFT_{KL}$ is connected with the scan line $G_K$, a source electrode of the thin film transistor $TFT_{KL}$ is connected with the data line $S_L$, and a drain electrode of the thin film transistor $TFT_{KL}$ is connected with a pixel electrode $PE_{KL}$. A liquid crystal capacitor $CL_{KL}$ (liquid crystal element) and a storage capacitor $CS_{KL}$ are formed between the pixel electrode $PE_{KL}$ and a common electrode VCOM which faces the pixel electrode $PE_{KL}$ through a liquid crystal element (electro-optical substance in a broad sense). A liquid crystal is sealed between the active matrix substrate on which the thin film transistor $TFT_{KL}$, the pixel electrode $PE_{KL}$, and the like are formed and a common substrate on which the common electrode VCOM is formed. The transmissivity of the pixel changes corresponding to the voltage applied between the pixel electrode $PE_{KL}$ and the common electrode VCOM.

A voltage applied to the common electrode VCOM is generated by the power supply circuit 542. The common electrode VCOM may be formed in a stripe pattern corresponding to each scan line instead of forming the common electrode COM over the common substrate.

The data line driver circuit 520 drives the data lines $S_1$ to $S_N$ of the liquid crystal panel 512 based on grayscale data. The scan line driver circuit 530 sequentially scans the scan lines $G_1$ to $G_M$ of the liquid crystal panel 512.

The controller 540 controls the data line driver circuit 520, the scan line driver circuit 530, and the power supply circuit 542 according to information set by a host such as a central processing unit (CPU) (not shown).

In more detail, the controller 540 sets an operation mode or supplies a vertical synchronization signal or a horizontal synchronization signal generated therein to the data line driver circuit 520 and the scan line driver circuit 530, and controls the polarity reversal timing of the voltage of the common electrode VCOM for the power supply circuit 542, for example.

The power supply circuit 542 generates the voltage (grayscale voltage) necessary for driving the liquid crystal panel 512 and the voltage of the common electrode VCOM based on a reference voltage supplied from the outside.

In FIG. 1, the liquid crystal device 510 includes the controller 540. Note that the controller 540 may be provided outside the liquid crystal device 510. Or, the host may be included in the liquid crystal device 510 together with the controller 540.

Figure 2:
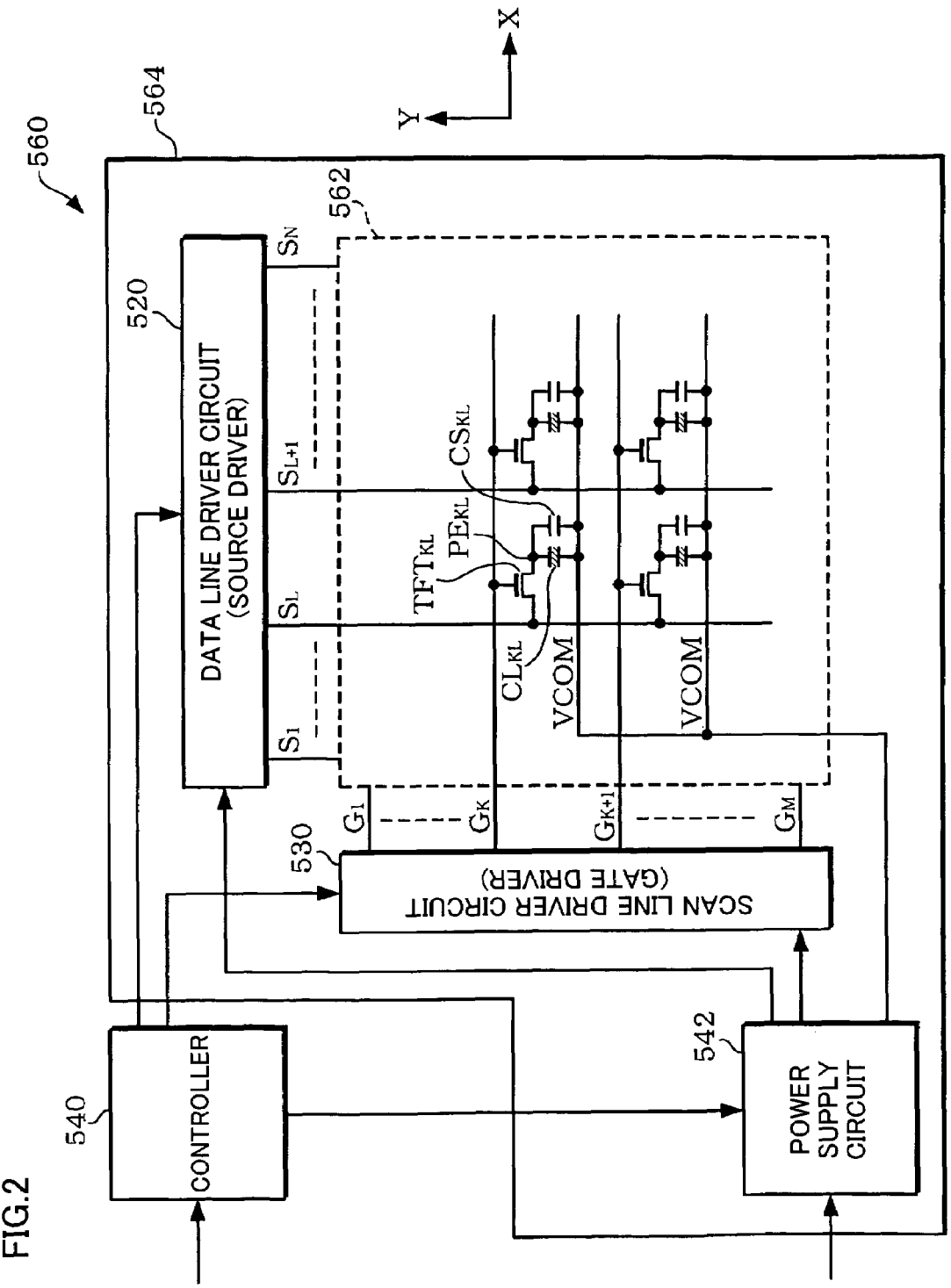
FIG. 2 is a block diagram of another configuration example of a display device including an electro-optical device according to one embodiment of the invention.

FIG. 2 is a block diagram of another configuration example of the display device according to this embodiment. In FIG. 2, the same sections as shown in FIG. 1 are indicated by the same symbols. Description of these sections is appropriately omitted.

In a liquid crystal device 560 shown in FIG. 2, the data line driver circuit 520, the scan line driver circuit 530, and the power supply circuit 542 are formed on an active matrix substrate 564 in which pixels are formed as described above in a pixel formation area 562. At least one of the data line driver circuit 520, the scan line driver circuit 530, and the power supply circuit 542 shown in FIG. 2 may be omitted from the circuit blocks formed on the active matrix substrate 564. Or, the controller 540 may also be formed on the active matrix substrate 564 shown in FIG. 2.

1.1 Data Line Driver Circuit

Figure 3:
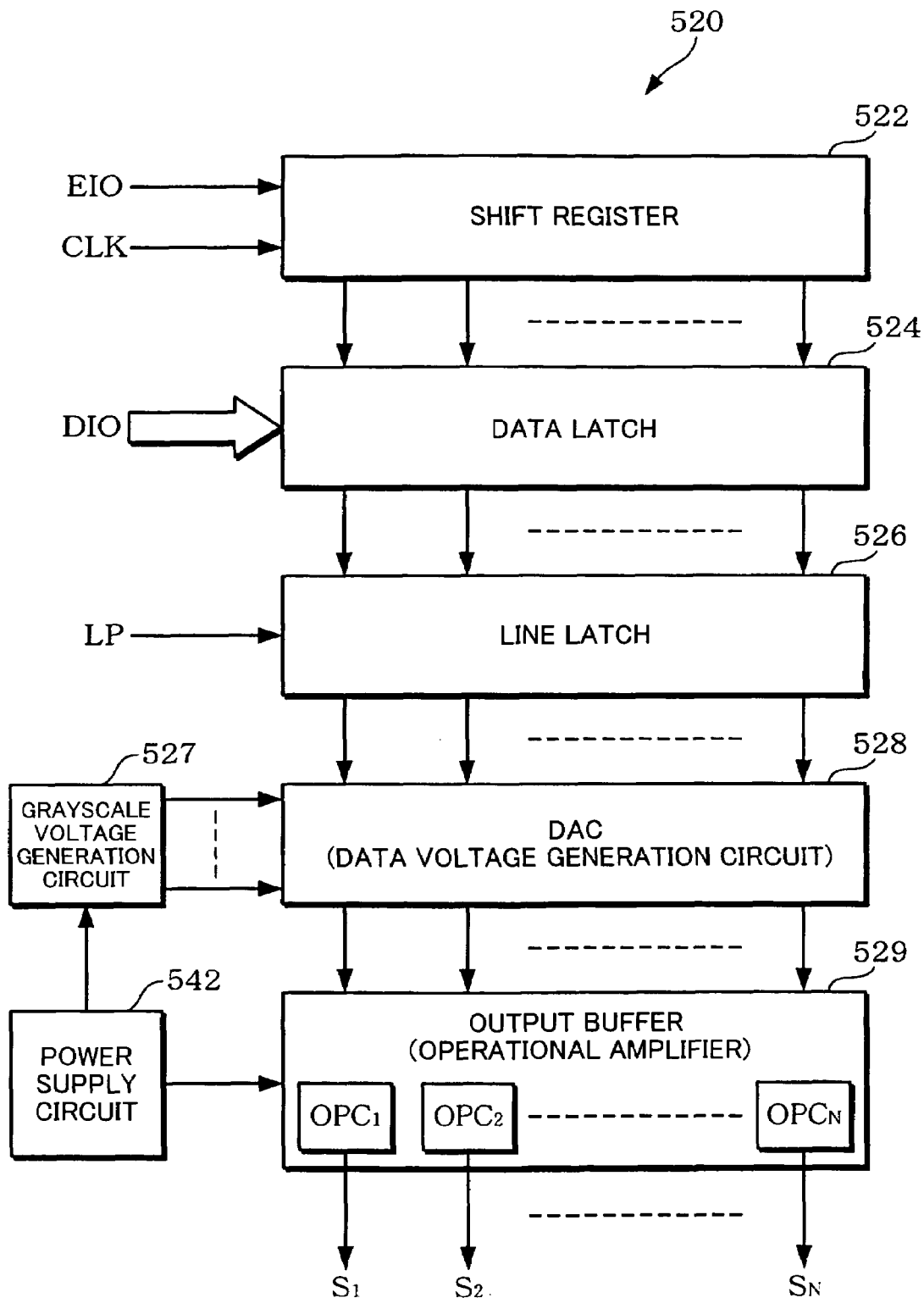
FIG. 3 is a block diagram of a configuration example of a data line driver circuit shown in FIG. 1 or FIG. 2.

FIG. 3 shows a configuration example of the data line driver circuit 520 shown in FIG. 1 or FIG. 2. FIG. 3 shows a configuration example when the power supply circuit 542 is included in the data line driver circuit 520.

The data line driver circuit 520 (driver circuit in a broad sense) includes a shift register 522, a data latch 524, a line latch 526, a DAC 528 (digital-analog conversion circuit; data voltage generation circuit in a broad sense), and an output buffer 529 (operational amplifier).

The shift register 522 includes a plurality of flip-flops provided in data line units and sequentially connected. The shift register 522 holds an enable input-output signal EIO in synchronization with a clock signal CLK, and sequentially shifts the enable input-output signal EIO to the adjacent flip-flops in synchronization with the clock signal CLK.

Grayscale data (DIO) is input to the data latch 524 from the controller 540 in units of 18 bits (6 bits (grayscale data)×3 (each color of RGB)), for example. The data latch 524 latches the grayscale data (DIO) in synchronization with the enable input-output signal EIO sequentially shifted by the flip-flops of the shift register 522.

The line latch 526 latches the grayscale data in horizontal scan units latched by the data latch 524 in synchronization with a horizontal synchronization signal LP supplied from the controller 540.

A grayscale voltage generation circuit 527 divides the power supply voltage from the power supply circuit 542 using resistors to generate a plurality of grayscale voltages. The grayscale voltages generated by the grayscale voltage generation circuit 527 are supplied to the DAC 528.

The DAC 528 generates an analog data voltage supplied to the data line. In more detail, the DAC 528 selects one of the grayscale voltages from the grayscale voltage generation circuit 527 based on the digital grayscale data from the line latch 526, and outputs an analog data voltage corresponding to the digital grayscale data.

The output buffer 529 buffers the data voltage from the DAC 528, and drives the data line by outputting the data voltage to the data line. In more detail, the output buffer 529 includes voltage-follower-connected operational amplifiers $OPC_1$ to $OPC_N$ provided in data line units. The operational amplifier performs impedance conversion of the data voltage from the DAC 528, and outputs the resulting voltage to the data line.

In FIG. 3, the digital grayscale data is subjected to digital-analog conversion and output to the data line through the output buffer 529. Note that an analog image signal may be sampled, held, and output to the data line through the output buffer 529.

1.2 Scan Line Driver Circuit

Figure 4:
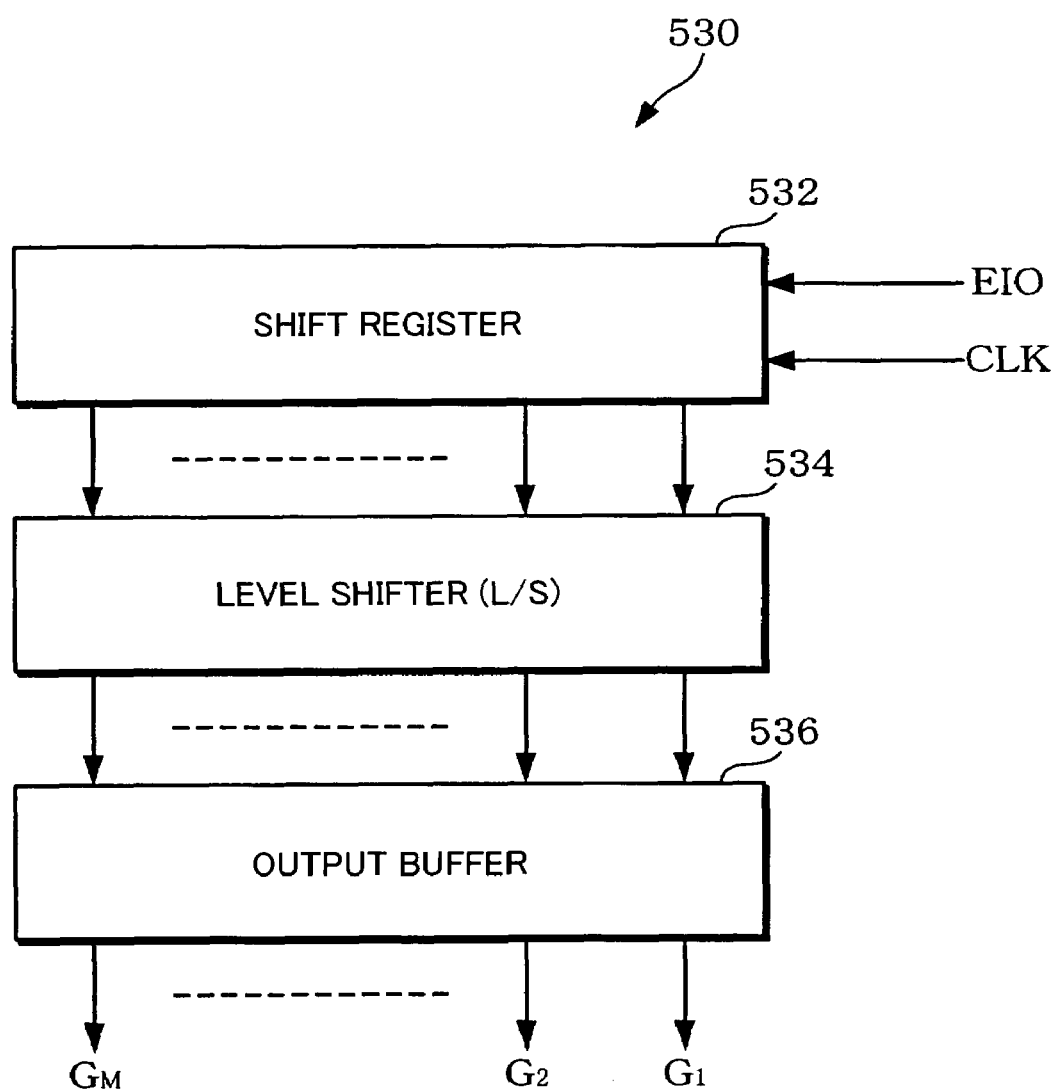
FIG. 4 is a block diagram of a configuration example of a scan line driver circuit shown in FIG. 1 or FIG. 2.

FIG. 4 shows a configuration example of the scan line driver circuit 530 shown in FIG. 1 or FIG. 2.

The scan line driver circuit 530 includes a shift register 532, a level shifter 534, and an output buffer 536.

The shift register 532 includes a plurality of flip-flops provided corresponding to the scan lines and sequentially connected. The shift register 532 holds the enable input-output signal EIO in the flip-flop in synchronization with the clock signal CLK, and sequentially shifts the enable input-output signal EIO to the adjacent flip-flops in synchronization with the clock signal CLK. The enable input-output signal EIO input to the shift register 532 is a vertical synchronization signal supplied from the controller 540.

The level shifter 534 shifts the level of the voltage from the shift register 532 to the voltage level corresponding to the liquid crystal element of the liquid crystal panel 512 and the transistor performance of the thin film transistor TFT. As the voltage level, a high voltage level of 20 to 50 V is necessary, for example.

The output buffer 536 buffers the scan voltage shifted by the level shifter 534, and drives the scan line by outputting the scan voltage to the scan line.

2. Power Supply Circuit and Reference Clock Signal Generation Circuit

Figure 5:
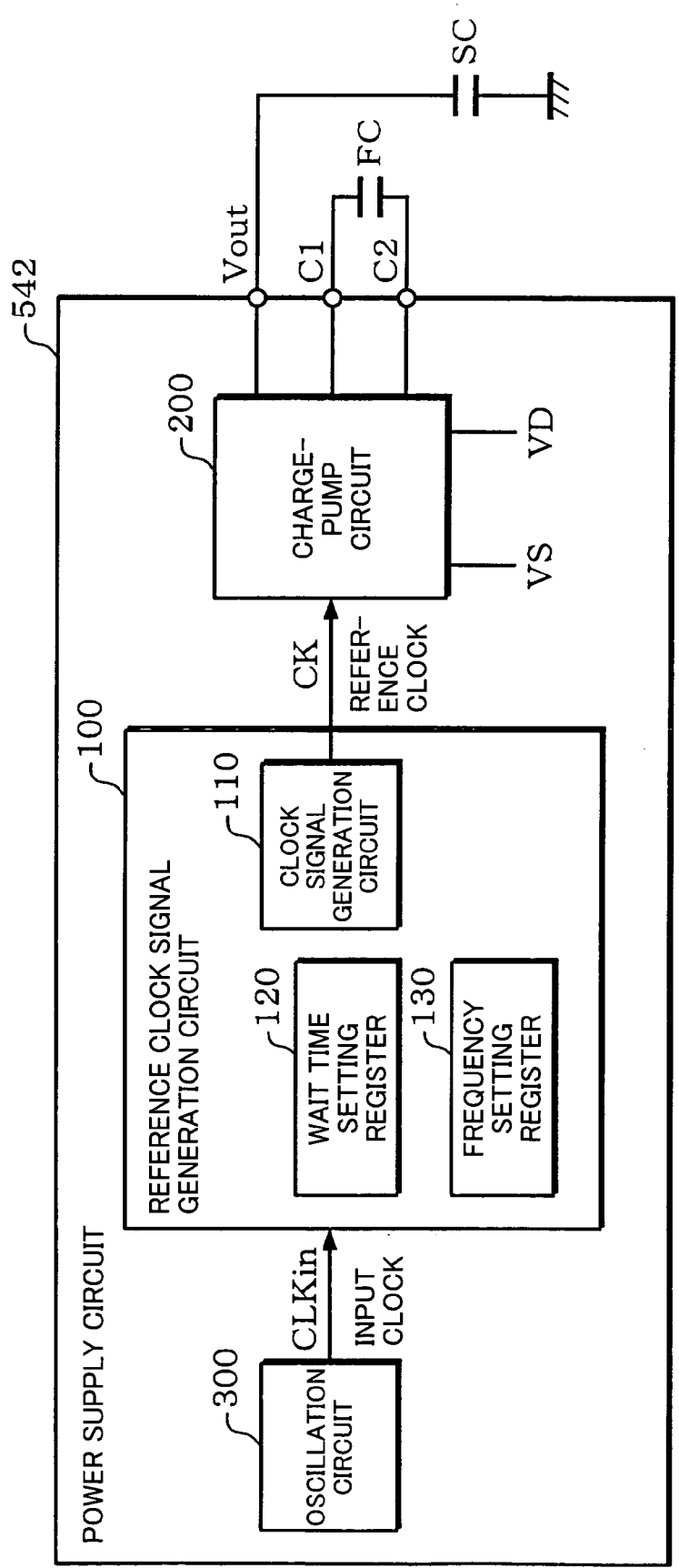
FIG. 5 is a block diagram of a configuration example of a power supply circuit according to one embodiment of the invention.

FIG. 5 is a block diagram of a configuration example of the power supply circuit 542. FIG. 5 shows an example of increasing the voltage (input voltage) between a high-potential-side voltage VD and a low-potential-side voltage VS. Note that the voltage may be lowered.

The power supply circuit 542 may include a reference clock signal generation circuit 100 and a charge-pump circuit 200. The reference clock signal generation circuit 100 generates a reference clock signal CK for the charge-pump operation of the charge-pump circuit 200. The charge-pump circuit 200 includes one or more switch devices for performing the charge-pump operation. The switch device of the charge-pump circuit 200 is switch-controlled (ON/OFF controlled) based on the reference clock signal CK.

The charge-pump circuit 200 performs a charging operation of storing electric charges in a flying capacitor FC connected outside the power supply circuit 542 and a pumping operation of storing electric charges in a stabilization capacitor SC in synchronization with the reference clock signal CK. The flying capacitor FC is connected with both ends of one of the switch devices of the charge-pump circuit 200. The stabilization capacitor SC is connected between the output of the charge-pump circuit 200 and a system ground power supply line to which a system ground power supply voltage is supplied.

The following description is given on the assumption that the charge-pump circuit 200 performs a twofold step-up charge-pump operation. Note that this embodiment is not limited to the step-up factor.

The reference clock signal generation circuit 100 includes a clock signal generation circuit 110, a wait time setting register 120, and a frequency setting register 130.

The clock signal generation circuit 110 generates a reference clock signal CK having one of first to nth (n is an integer of two or more) frequencies. A value corresponding to a wait time is set in the wait time setting register 120. A value corresponding to one of the first to nth frequencies is set in the frequency setting register 130. These values are set in the wait time setting register 120 and the frequency setting register 130 by the controller 540 or the host (not shown). The clock signal generation circuit 110 generates the reference clock signal having a predetermined frequency regardless of the value set in the frequency setting register 130 in a start period from the start of the charge-pump operation to the completion of the wait time, and generates the reference clock signal having a frequency corresponding to the value set in the frequency setting register 130 in an operation period after the start period.

The power supply circuit 542 may include an oscillation circuit 300. The oscillation circuit 300 includes a crystal oscillator, and supplies the oscillation output from the crystal oscillator to the reference clock signal generation circuit 100 as an input clock signal CLKin. In this case, the clock signal generation circuit 110 generates the reference clock signal CK based on the input clock signal CLKin.

Figure 6:
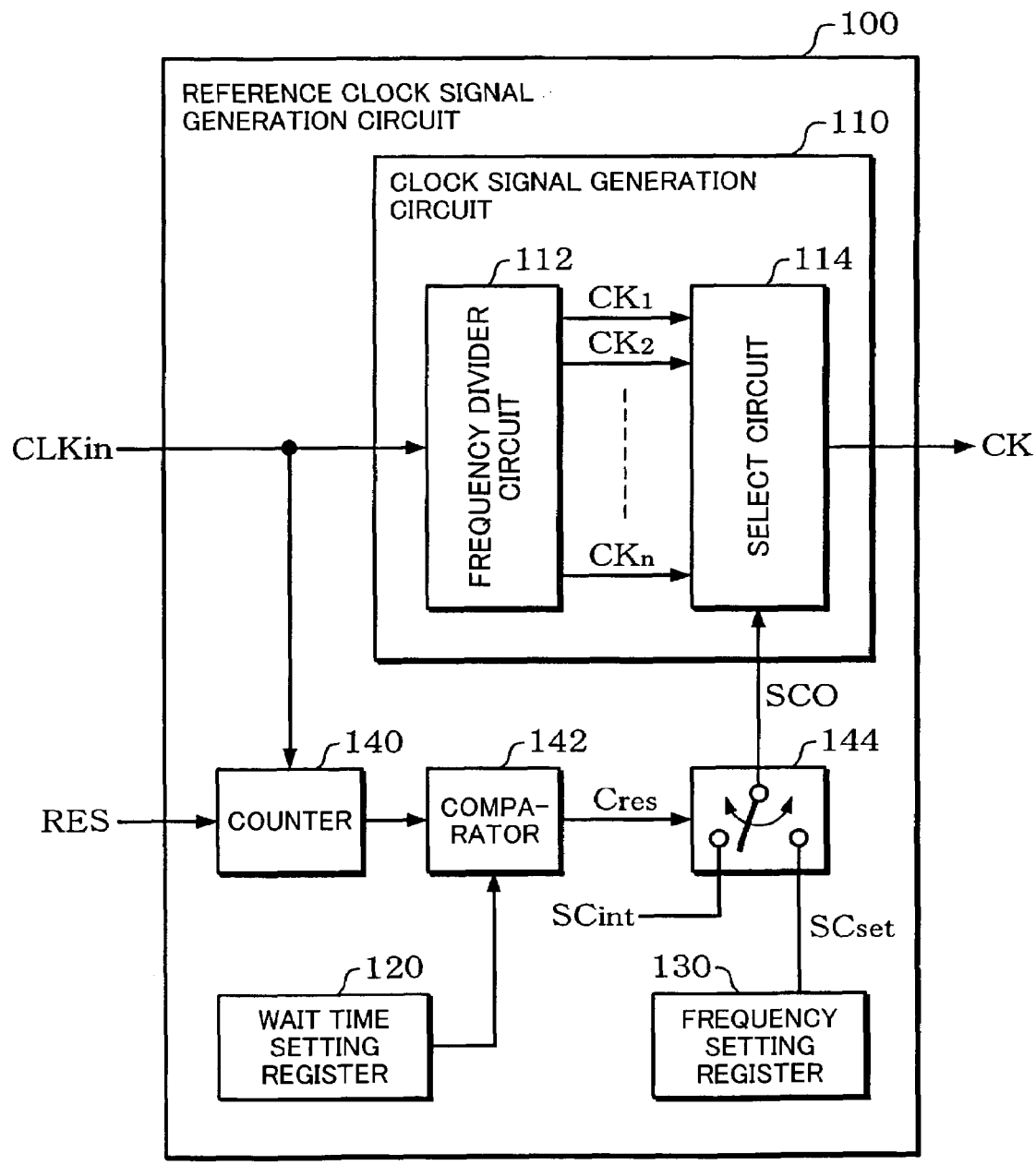
FIG. 6 is a block diagram of a configuration example of a reference clock signal generation circuit shown in FIG. 5.

FIG. 6 is a block diagram of a configuration example of the reference clock signal generation circuit 100 shown in FIG. 5.

In FIG. 6, the same sections as shown in FIG. 5 are indicated by the same symbols. Description of these sections is appropriately omitted.

The clock signal generation circuit 110 includes a frequency divider circuit 112 and a select circuit 114. The frequency divider circuit 112 divides the frequency of the input clock signal CLKin and generates first to nth frequency-divided clock signals $CK_1$ to $CK_n$ respectively having the first to nth frequencies. The select circuit 114 selects and outputs one of the first to nth frequency-divided clock signals $CK_1$ to $CK_n$ as the reference clock signal CK based on a select control signal SCO. The select circuit 114 outputs the kth ($1 \leq k \leq n$, k is an integer) frequency-divided clock signal $CK_k$ as the reference clock signal CK having a predetermined frequency in the start period from the start of the charge-pump operation to the completion of the wait time corresponding to the value set in the wait time setting register 120, and outputs the jth ($1 \leq j \leq n$, j is an integer excluding k) frequency-divided clock signal $CK_j$ in the operation period after the start period as the reference clock signal CK having a frequency corresponding to the value set in the frequency setting register 130. The start timing of the charge-pump operation is the timing at which an initialization signal RES changes from active to inactive, and the reference clock signal CK changes as a switch control signal after the start timing.

In FIG. 6, the frequency of the kth frequency-divided clock signal $CK_k$ is higher than the frequency of the jth frequency-divided clock signal $CK_j$. Therefore, the frequency of the reference clock signal CK in the start period is higher than the frequency of the reference clock signal CK in the operation period. Specifically, the output capability in the start period can be increased in comparison with the output capability in the operation period, and the power consumption of the power supply circuit 542 can be reduced in the operation period.

The reference clock signal generation circuit 100 may include a counter 140, a comparator 142, and a switch circuit 144. The count value of the counter 140 is initialized in a period in which the initialization signal RES is active. The counter 140 counts the number of input clock signals CLKin in a period in which the initialization signal RES is inactive. The comparator 142 compares the count value of the counter 140 with the value set in the wait time setting register 120, and sets a switch control signal Cres to active when the values coincide. The switch circuit 144 selectively outputs a start period select control signal SCint or an operation period select control signal SCset corresponding to the value set in the frequency setting register 130 as the select control signal SCO based on the switch control signal Cres. The start period select control signal SCint is a signal for outputting the kth frequency-divided clock signal $CK_k$ as the reference clock signal CK.

Figure 7:
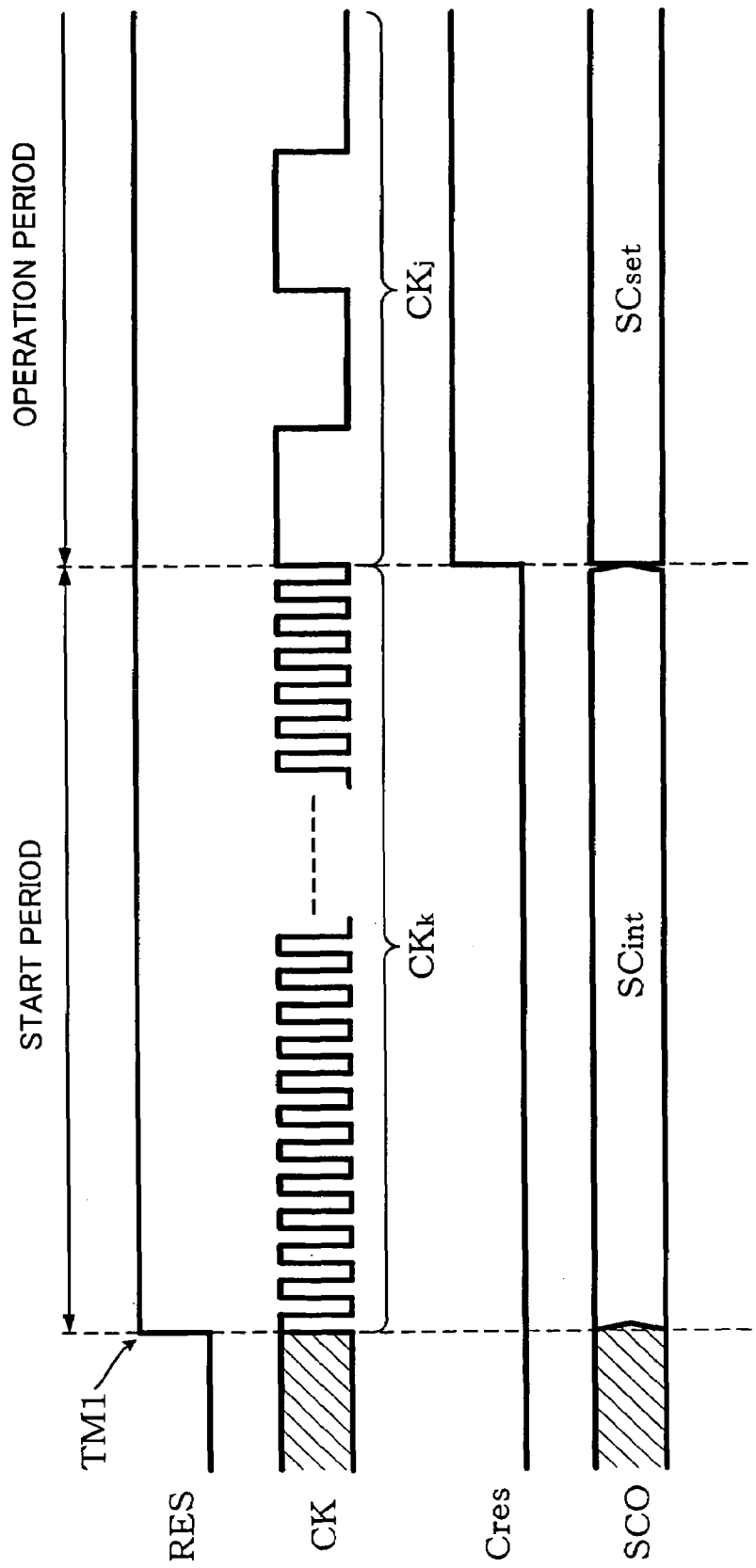
FIG. 7 is a timing diagram of an operation example of the reference clock signal generation circuit shown in FIG. 6.

FIG. 7 shows the timing of an operation example of the reference clock signal generation circuit 100 shown in FIG. 6.

The start period starts at a timing at which the initialization signal RES changes from active to inactive (TM1). In the start period, the switch control signal Cres is inactive. Therefore, the switch circuit 144 outputs the start period select control signal SCint as the select control signal SCO. Accordingly, the select circuit 114 outputs the kth frequency-divided clock signal $CK_k$ of the first to nth frequency-divided clock signals $CK_1$ to $CK_n$ as the reference clock signal CK.

When the comparator 142 has detected that the count value of the counter 140 coincides with the value set in the wait time setting register 120, the switch control signal Cres is set to active, whereby the operation period starts. Therefore, the switch circuit 144 outputs the operation period select control signal SCset as the select control signal SCO. Accordingly, the select circuit 114 outputs the jth frequency-divided clock signal $CK_j$ of the first to nth frequency-divided clock signals $CK_1$ to $CK_n$ as the reference clock signal CK.

Figure 8:
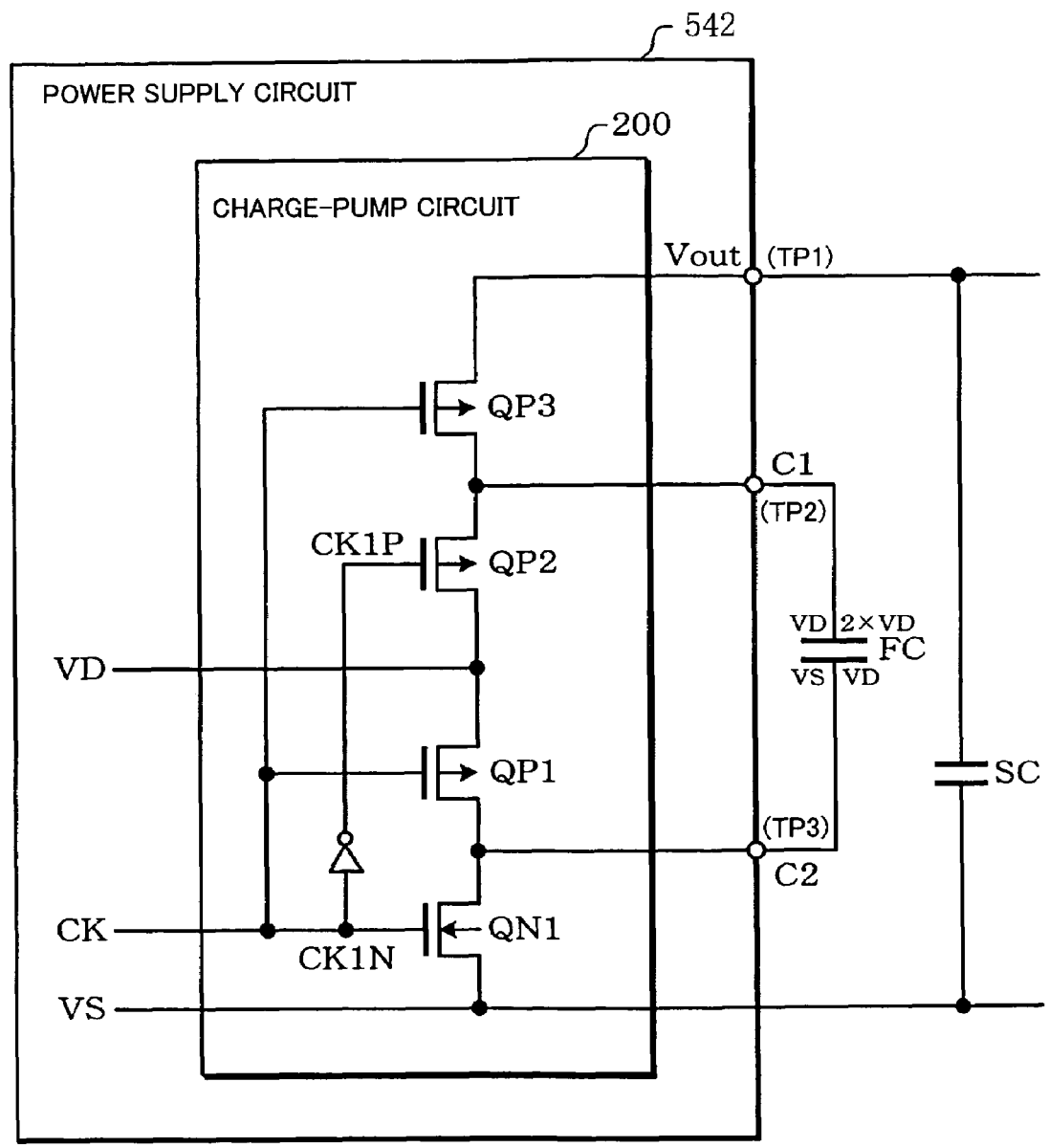
FIG. 8 is a circuit diagram of a configuration example of a charge-pump circuit.

FIG. 8 is a circuit diagram of a configuration example of the charge-pump circuit 200.

The charge-pump circuit 200 includes an N-type metal-oxide-semiconductor (MOS) transistor (MOS transistor is hereinafter called "transistor") (switch device in a broad sense; hereinafter the same) QN1 and a P-type transistor QP1 connected in series between a high-potential-side power supply line to which the high-potential-side voltage VD is supplied and a low-potential-side power supply line to which the low-potential-side voltage VS is supplied. The charge-pump circuit 200 also includes P-type transistors QP2 and QP3 connected in series between the high-potential-side power supply line and an output power supply line through which an output voltage Vout is output.

The power supply circuit 542 includes an output voltage output terminal TP1 and flying capacitor connection terminals TP2 and TP3. The output power supply line is electrically connected with the output voltage output terminal TP1. A connection node of the transistors QP2 and QP3 is electrically connected with the flying capacitor connection terminal TP2. A connection node of the transistors QP1 and QN1 is electrically connected with the flying capacitor connection terminal TP3. The stabilization capacitor SC is connected between the output voltage output terminal TP1 and the system ground power supply line at a potential equal to that of the low-potential-side voltage outside the power supply circuit 542. The flying capacitor FC is connected between the flying capacitor connection terminals TP2 and TP3 outside the power supply circuit 542.

In FIG. 8, the transistors QN1 and QP1 to QP3 are gate-controlled based on the reference clock signal CK. Specifically, the transistors QN1 and QP1 to QP3 as the switch devices are switch-controlled based on the reference clock signal CK.

Figure 9:
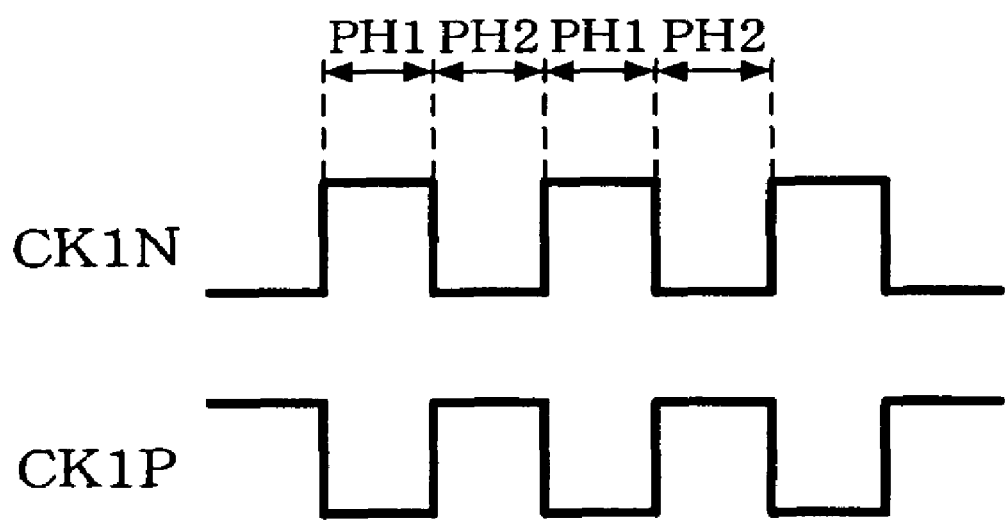
FIG. 9 is a diagram illustrative of an operation principle of a charge-pump operation clock signal.

The reference clock signal CK is supplied to the gates of the transistors QN1, QP1, and QP3. An inversion output of the reference clock signal CK is supplied to the gate of the transistor QP2. Specifically, charge-pump operation clock signals CK1N and CK1P as shown in FIG. 9 are generated based on the reference clock signal CK, and supplied to the gates of the transistors. In order to prevent the drain currents of two transistors connected in series from passing through the transistors, the gate signals are generated so that the rise timing and the fall timing of the gate signals do not overlap.

In the charge-pump circuit 200, in a phase PH1 in which the charge-pump operation clock signal CK1N is set at the H level and the charge-pump operation clock signal CK1P is set at the L level, the transistors QN1 and QP2 are turned ON, and the transistors QP1 and QP3 are turned OFF. Therefore, the low-potential-side voltage VS is supplied to one end of the flying capacitor FC, and the high-potential-side voltage VD is supplied to the other end of the flying capacitor FC. In a phase PH2 in which the charge-pump operation clock signal CK1N is set at the L level and the charge-pump operation clock signal CK1P is set at the H level, the transistors QN1 and QP2 are turned OFF, and the transistors QP1 and QP3 are turned ON. Therefore, the high-potential-side voltage VD is supplied to one end of the flying capacitor FC, and the other end of the flying capacitor FC is set at a voltage twice the high-potential-side voltage VD. The output power supply line is set at the voltage of the other end of the flying capacitor FC through the transistor QP3, and electric charges are stored through one end of the stabilization capacitor SC, whereby the voltage of the output power supply line is held.

Figure 10:
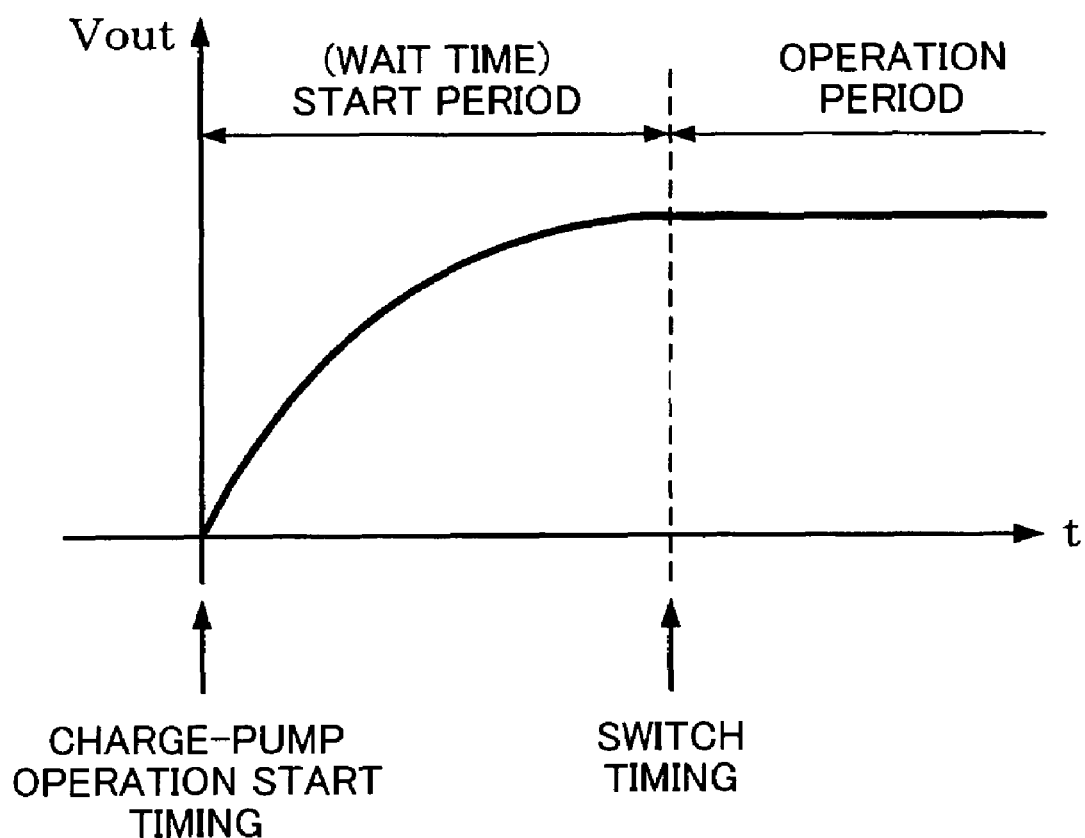
FIG. 10 is a diagram illustrative of one embodiment of the invention.

FIG. 10 is a diagram illustrative of the operation according to this embodiment.

The kth frequency-divided clock signal $CK_k$ is output as the reference clock signal CK in the start period, and the jth frequency-divided clock signal $CK_j$ is output as the reference clock signal CK in the operation period, as described above. The frequency of the kth frequency-divided clock signal $CK_k$ is higher than the frequency of the jth frequency-divided clock signal $CK_j$. Therefore, the output capability in the start period, in which it is necessary to raise the output voltage Vout to a specific voltage, can be increased in comparison with the output capability in the operation period. In the operation period, the power consumption of the power supply circuit 542 can be reduced.

As described above, this embodiment allows the frequency of the reference clock signal to differ in the start period and the operation period after the start period regardless of the value set in the frequency setting register. Therefore, the output capability in the start period can be caused to differ from the output capability in the operation period regardless of the value set in the frequency setting register. Therefore, since the reference clock signal having a minimum design frequency can be generated in the start period. It suffices that the user to set the frequency of the reference clock signal corresponding to the load in the frequency setting register, whereby the frequency of the reference clock signal is not unnecessarily increased. As a result, power consumption can be reduced while maintaining the output capability of the power supply circuit.

Moreover, the output capability in the start period, in which it is necessary to raise the output voltage Vout to a specific voltage, can be increased in comparison with the output capability in the operation period by setting the frequency of the reference clock signal in the start period to be higher than the frequency of the reference clock signal in the operation period. In the operation period, the power consumption of the power supply circuit can be reduced.

When a high output capability is unnecessary for the power supply circuit in the operation period, the user need not set the frequency of the reference clock signal in the start period taking into consideration the period provided in the specification, and set the frequency of the reference clock signal in the operation period at a lower frequency. Therefore, the size of firmware provided by the user or the like for controlling the reference clock signal can be reduced.

Moreover, since the actual start period of the power supply circuit is known when allowing the user to set the frequency of the reference clock signal, a problem can be prevented in which it may be difficult to determine whether a malfunction is caused by the user's setting or by a malfunction of the power supply circuit.

2.1 Modification

In this embodiment, the start period and the operation period are provided. The reference clock signal having a predetermined frequency is output in the start period regardless of the value set in the register, and the reference clock signal having a frequency corresponding to the value set in the register is output in the operation period. A modification of this embodiment allows the frequency of the reference clock signal to be changed in the operation period to prevent deterioration of the image quality due to a decrease in the output capability of the charge-pump circuit and reduce power consumption.

Figure 11:
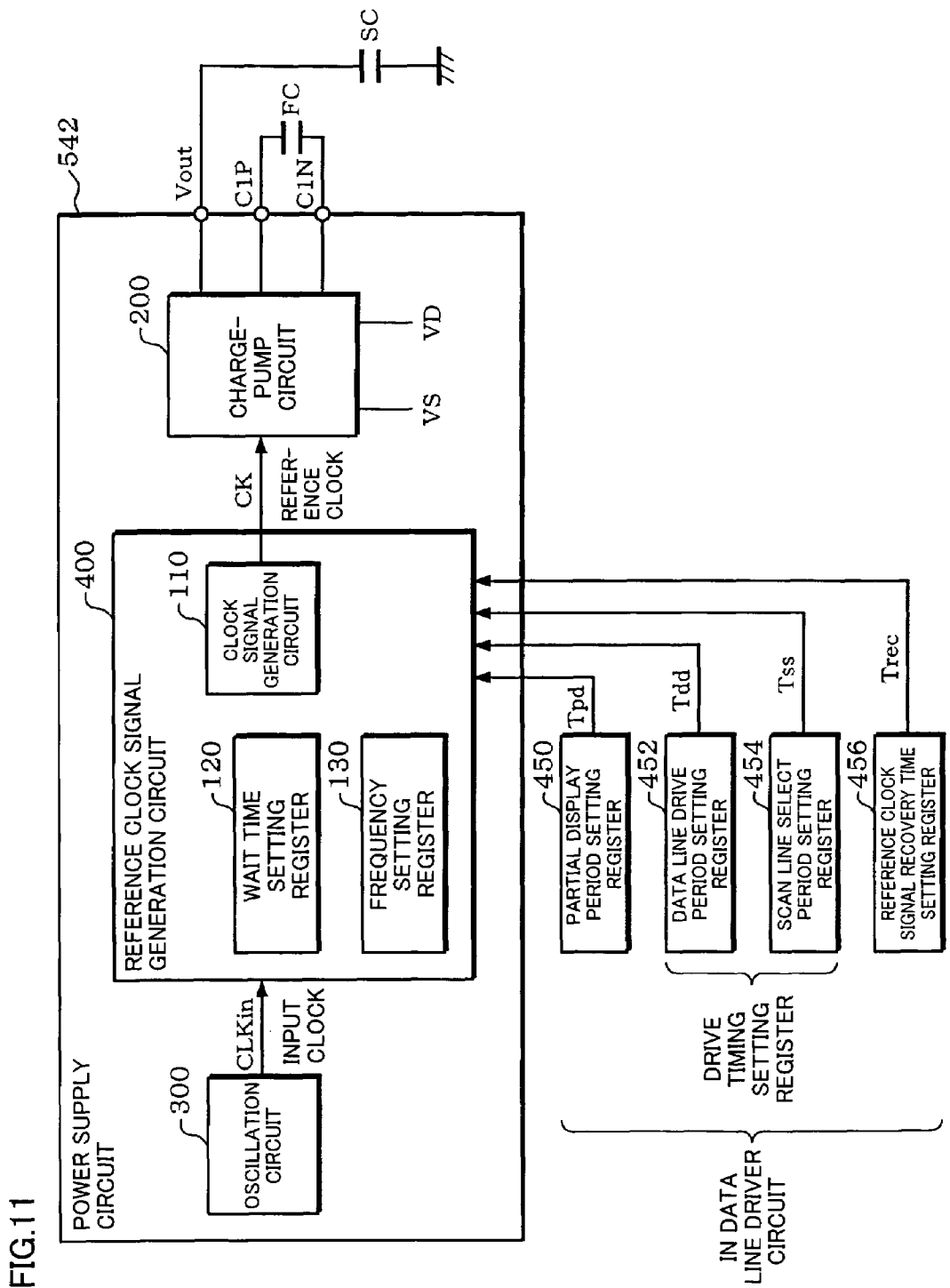
FIG. 11 is a block diagram of a configuration of a power supply circuit according to a modification of one embodiment of the invention.

FIG. 11 is a block diagram of a configuration example of a power supply circuit according to the modification of this embodiment. In FIG. 11, the same sections as shown in FIG. 5 are indicated by the same symbols. Description of these sections is appropriately omitted.

The power supply circuit according to this modification differs from the power supply circuit shown in FIG. 5 in that various register values which specify the drive timing of the data line driver circuit 520 are supplied to the reference clock signal generation circuit. Therefore, this modification allows a reference clock signal generation circuit 400 to change the frequency of the reference clock signal CK corresponding to the drive timing of the data line driver circuit 520.

For example, the data line driver circuit 520 may include a partial display period setting register 450, a data line drive period setting register 452, a scan line select period setting register 454, and a reference clock signal recovery time setting register 456 as control registers. The data line drive period setting register 452 and the scan line select period setting register 454 may be formed by one register as a drive timing setting register for setting the drive timing.

The values are set in the above registers by the controller 540 or the host (not shown). The data line driver circuit 520 need not necessarily include all of the partial display period setting register 450, the data line drive period setting register 452, the scan line select period setting register 454, and the reference clock signal recovery time setting register 456. At least one of these registers may be omitted.

Figure 12:
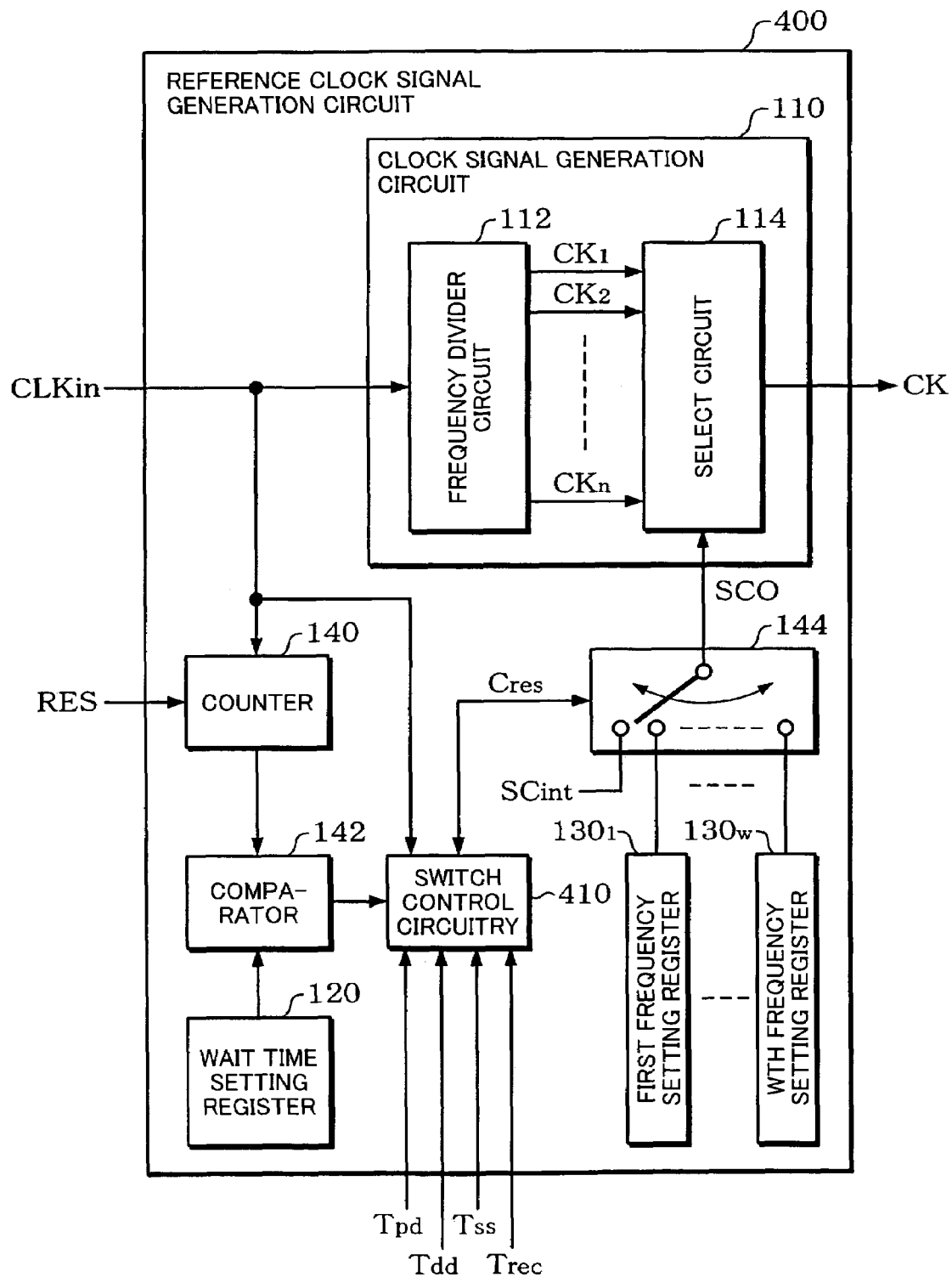
FIG. 12 is a block diagram of a configuration example of a reference clock signal generation circuit shown in FIG. 11.

FIG. 12 is a block diagram of a configuration example of the reference clock signal generation circuit 400 shown in FIG. 11. In FIG. 12, the same sections as shown in FIG. 6 are indicated by the same symbols. Description of these sections is appropriately omitted.

The reference clock signal generation circuit 400 shown in FIG. 12 differs from the reference clock signal generation circuit 100 shown in FIG. 6 in that a switch control circuitry 410 generates the switch control signal Cres and first to wth (w is an integer of two or more) frequency setting registers $130_1$ to $130_w$ are provided instead of the frequency setting register 130. One of the first to wth frequency setting registers $130_1$ to $130_w$ is associated in advance with each of the partial display period setting register 450, the data line drive period setting register 452, the scan line select period setting register 454, and the reference clock signal recovery time setting register 456. Or, one of the first to wth frequency setting registers $130_1$ to $130_w$ is associated with each of the partial display period setting register 450, the data line drive period setting register 452, the scan line select period setting register 454, and the reference clock signal recovery time setting register 456 based on the value set in each register.

The switch control circuit 410 may include a plurality of counters which count the number of input clock signals CLKin (or reference clock signals CK) in the operation period. When the count value of each counter coincides with the value set in each of the partial display period setting register 450, the data line drive period setting register 452, the scan line select period setting register 454, and the reference clock signal recovery time setting register 456, the switch control circuit 410 changes the switch control signal Cres. The switch circuit 144 outputs the value set in one of the first to wth frequency setting registers $130_1$ to $130_w$ selected based on the switch control signal Cres as the select control signal SCO.

The count value of the counter for comparing the count value with the value set in the partial display period setting register 450 is initialized in vertical scan period units. The data line driver circuit 520 drives the data lines in a partial display area display period set using the partial display period setting register 450.

The count value of the counter for comparing the count value with the value set in each of the data line drive period setting register 452, the scan line select period setting register 454, and the reference clock signal recovery time setting register 456 is initialized in units of horizontal scan periods.

A value for setting a partial display area designated in units of scan lines is set in the partial display period setting register 450 shown in FIG. 11.

Figure 13:
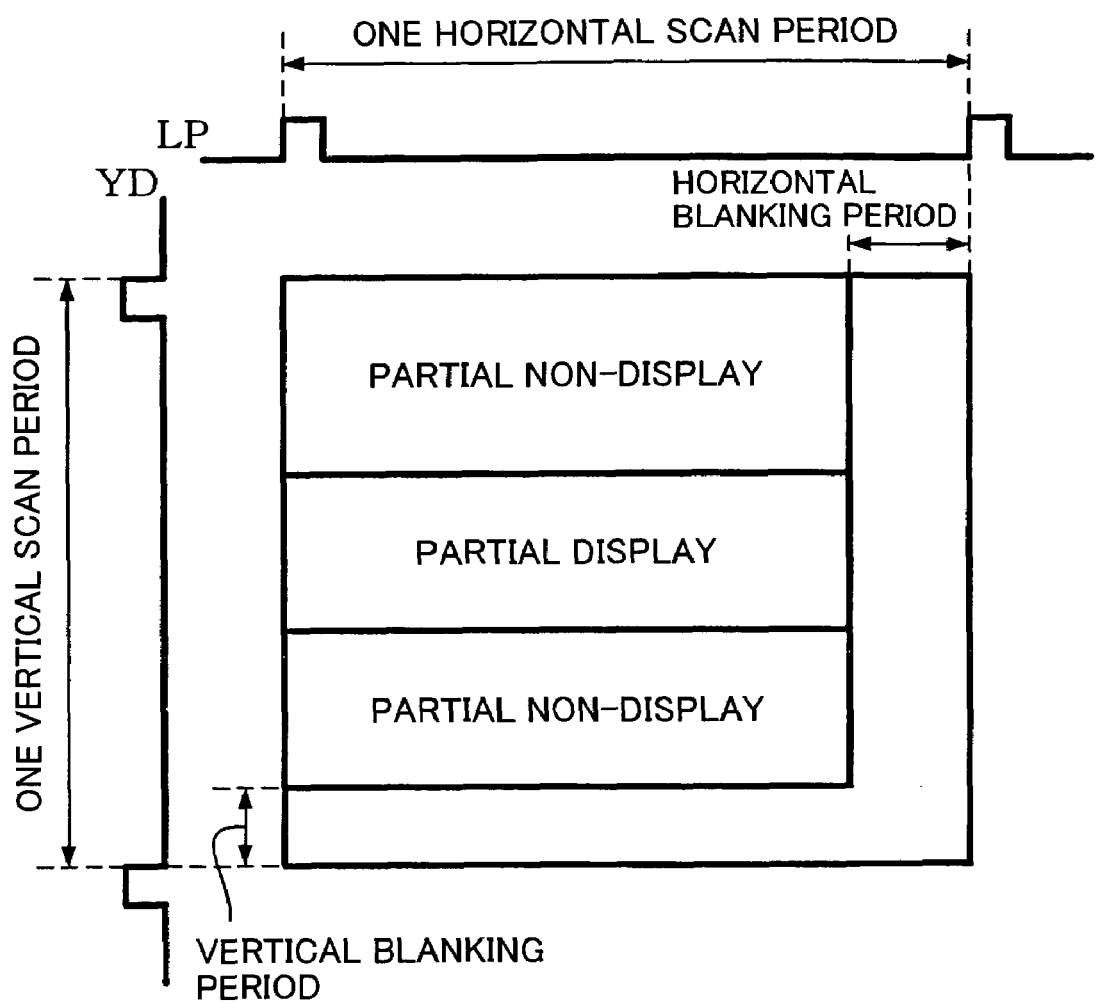
FIG. 13 is a diagram illustrative of a partial display area.

FIG. 13 is a diagram illustrative of the partial display area.

One horizontal scan period is specified by the horizontal synchronization signal LP. One vertical scan period is specified by a vertical synchronization signal YD. It is possible to display one frame (screen) by repeating the horizontal display period in one horizontal scan period in the number of scan lines. In this case, since it is unnecessary to drive the data lines in a non-display area by designating a display area and a non-display area in units of scan lines, power consumption can be reduced. The non-display area is called a partial non-display area, and the display area is called a partial display area.

In this modification, the reference clock signal generation circuit 400 outputs the pth ($1 \leq p \leq n$, p is an integer) frequency-divided clock signal $CK_p$ having the pth frequency as the reference clock signal CK in a partial display area scan period in the operation period. The reference clock signal generation circuit 400 outputs the qth ($1 \leq q \leq n$, q is an integer excluding p) frequency-divided clock signal $CK_q$ having the qth frequency as the reference clock signal CK in a partial non-display area scan period in the operation period. The pth frequency is higher than the qth frequency. The pth frequency may be the kth frequency in the start period.

As a result, since the frequency of the reference clock signal CK can be reduced in the partial non-display area, power consumption can be reduced while preventing deterioration of the display image.

A value for designating a data line drive period in one horizontal scan period is set in the data line drive period setting register 452 shown in FIG. 11. A value for designating a scan line select period in one horizontal scan period is set in the scan line select period setting register 454. The data line driver circuit 520 drives the data lines using the drive period in one horizontal scan period set in the data line drive period setting register 452 as a display period. The data line driver circuit 520 may indicate a select period corresponding to the value set in the scan line select period setting register to the scan line driver circuit 530, for example.

Figure 14:
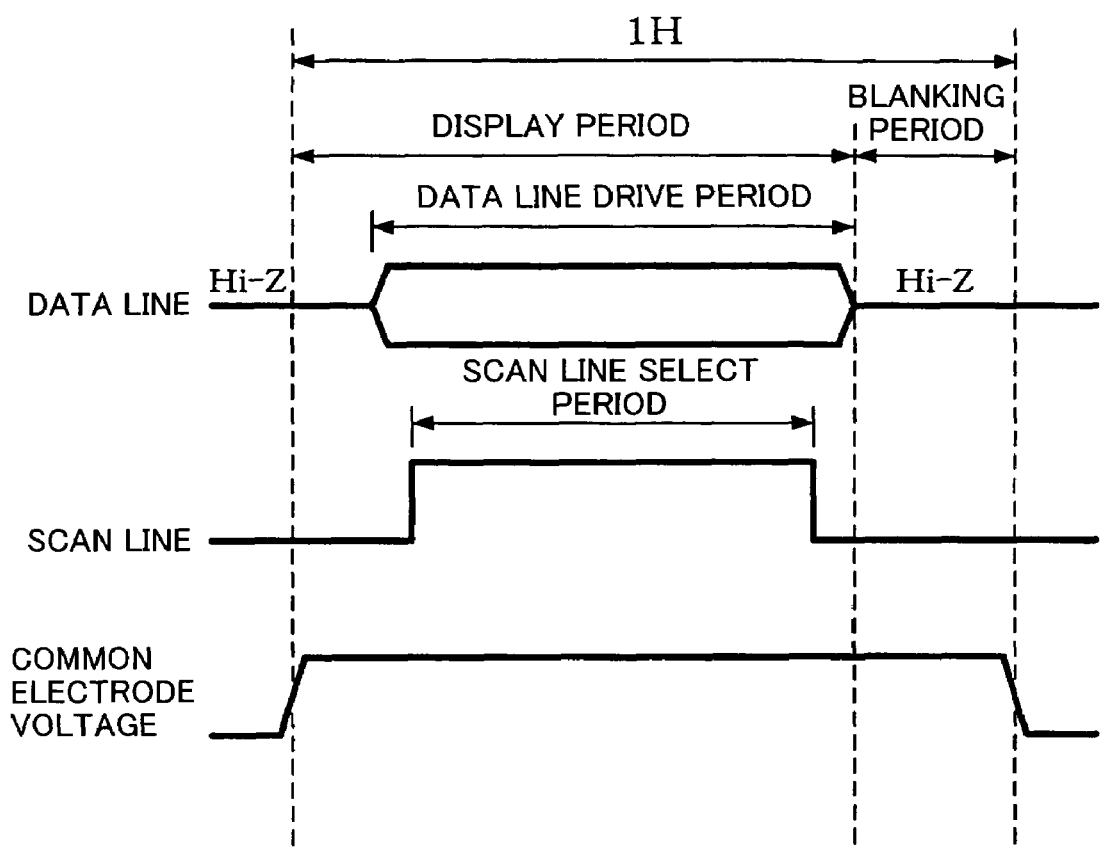
FIG. 14 is a diagram illustrative of a data line drive period and a scan line select period.

FIG. 14 is a diagram illustrative of the data line drive period and the scan line select period.

The display period in one horizontal scan period is specified based on the data line drive period, the scan line select period, and the change timing of the common electrode voltage, for example. The reference clock signal generation circuit 400 outputs the rth ($1 \leq r \leq n$, r is an integer) frequency-divided clock signal $CK_r$ having the rth frequency as the reference clock signal CK in the display period in one horizontal scan period of the operation period determined based on the data line drive period setting register 452 and the scan line select period setting register 454. The reference clock signal generation circuit 400 outputs the sth ($1 \leq s \leq n$, s is an integer excluding r) frequency-divided clock signal $CK_s$ having the sth frequency as the reference clock signal CK in a blanking period in the horizontal scan period of the operation period. The rth frequency is higher than the sth frequency. The rth frequency may be the kth frequency in the start period.

As a result, since the frequency of the reference clock signal CK can be reduced in the blanking period, power consumption can be reduced while preventing deterioration of the display image.

A value corresponding to the time at which the frequency of the reference clock signal CK is recovered from the frequency in the blanking period is set in the reference clock signal recovery time setting register 456 shown in FIG. 11.

Figure 15:
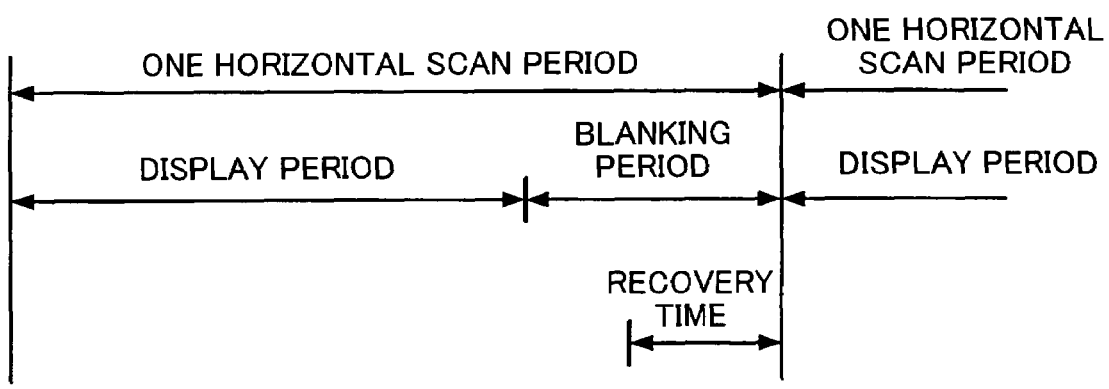
FIG. 15 is a diagram illustrative of a reference clock signal recovery time.

FIG. 15 is a diagram illustrative of the reference clock signal recovery time.

In the blanking period, when the time corresponding to the value set in the reference clock signal recovery time setting register 456 has elapsed, the reference clock signal generation circuit 400 changes the reference clock signal CK from the sth frequency-divided clock signal $CK_s$ to the rth frequency-divided clock signal $CK_r$ having the rth frequency.

As a result, since the data lines can be driven using the voltage generated by the high output capability in the display period subsequent to the blanking period, power consumption can be reduced while preventing deterioration of the display image.

As described above, this modification can prevent deterioration of the image quality due to a decrease in the output capability of the charge-pump circuit and reduce power consumption by allowing the frequency of the reference clock signal to be changed in the operation period.

The invention is not limited to the above-described embodiments. Various modifications and variations may be made within the spirit and scope of the invention. For example, the invention may be applied not only to drive the above-described liquid crystal display panel, but also to drive an electroluminescent or plasma display device.

The above embodiment or modification illustrates the case where the reference clock signal generation circuit generates one reference clock signal. Note that the reference clock signal generation circuit may generate two or more reference clock signals depending on the configuration of the charge-pump circuit realized corresponding to the step-up or step-down factor. The above embodiment or modification illustrates the case where the charge-pump operation clock signal is generated by the charge-pump circuit. Note that the charge-pump operation clock signal may be generated by the reference clock signal generation circuit.

The invention according to the dependent claim may have a configuration in which some of the elements of the claim on which the invention is dependent are omitted. It is possible to allow a feature of the invention according to one independent claim to depend on other independent claims.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A reference clock signal generation circuit for generating a reference clock signal for a charge-pump operation which raises or lowers a voltage, the reference clock signal generation circuit comprising:

a clock signal generation circuit which generates a reference clock signal having one of first to nth (n is an integer of two or more) frequencies;

a wait time setting register in which a value corresponding to a wait time is set; and a frequency setting register in which a value corresponding to one of the first to nth frequencies is set;

the clock signal generation circuit generating the reference clock signal having a predetermined frequency in a start period from start of the charge-pump operation to completion of the wait time, and generating the reference clock signal having a frequency corresponding to the value set in the frequency setting register in an operation period after the start period.

2. The reference clock signal generation circuit as defined in claim 1,
wherein the clock signal generation circuit includes:
a frequency divider circuit which divides a frequency of an input clock signal and generates first to nth frequency-divided clock signals respectively having the first to nth frequencies; and
a select circuit which selects and outputs one of the first to nth frequency-divided clock signals as the reference clock signal; and
wherein the select circuit outputs the kth ($1 \leq k \leq n$, k is an integer) frequency-divided clock signal in the start period as the reference clock signal having a predetermined frequency, and outputs the jth ($1 \leq j \leq n$, j is an integer excluding k) frequency-divided clock signal in the operation period as the reference clock signal having a frequency corresponding to the value set in the frequency setting register.

3. The reference clock signal generation circuit as defined in claim 2, wherein the frequency of the kth frequency-divided clock signal is higher than the frequency of the jth frequency-divided clock signal.

4. A power supply circuit for raising or lowering an input voltage, the power supply circuit comprising:
the reference clock signal generation circuit as defined in claim 1; and
one or more switch devices switch-controlled based on the reference clock signal generated by the reference clock signal generation circuit;
the power supply circuit raising or lowering the input voltage by a charge-pump operation using a capacitor connected with the one or more switch devices.

5. A driver circuit for driving an electro-optical device including a plurality of scan lines, a plurality of data lines, and pixel electrodes specified by the scan lines and the data lines, the driver circuit comprising:
the power supply circuit as defined in claim 4; and
an output buffer which supplies a voltage generated based on a voltage from the power supply circuit corresponding to grayscale data to the data line.

6. The driver circuit as defined in claim 5, comprising:
a partial display period setting register in which a partial display area designated in units of the scan lines is set;
wherein the reference clock signal generation circuit outputs a clock signal having the pth ($1 \leq p \leq n$, p is an integer) frequency as the reference clock signal in a partial display area scan period in the operation period, and outputs a clock signal having the qth ($1 \leq q \leq n$, q is an integer excluding p) frequency as the reference clock signal in a partial non-display area scan period in the operation period; and
wherein the pth frequency is higher than the qth frequency.

7. The driver circuit as defined in claim 5, comprising:
a data line drive period setting register for designating a data line drive period in one horizontal scan period; and
a scan line select period setting register for designating a scan line select period in one horizontal scan period;
wherein the reference clock signal generation circuit outputs a clock signal having the rth ($1 \leq r \leq n$, r is an integer) frequency as the reference clock signal in a display period in one horizontal scan period in the operation period determined based on the data line drive period setting register and the scan line select period setting register, and outputs a clock signal having the sth ($1 \leq s \leq n$, s is an integer excluding r) frequency as the reference clock signal in a blanking period in the horizontal scan period in the operation period; and
wherein the rth frequency is higher than the sth frequency.

8. The driver circuit as defined in claim 7, comprising:
a reference clock signal recovery setting register in which a value corresponding to time at which the frequency of the reference clock signal is recovered from the frequency in the blanking period is set;
wherein, when time corresponding to the value set in the reference clock signal recovery time setting register has elapsed in the blanking period, the reference clock signal generation circuit outputs the clock signal having the rth frequency as the reference clock signal.

9. An electro-optical device comprising:
a plurality of scan lines;
a plurality of data lines;
a plurality of pixel electrodes;
a scan line driver circuit which scans the scan lines; and
the driver circuit as defined in claim 5 which drives the data lines.

10. An electro-optical device comprising:
a plurality of scan lines;
a plurality of data lines;
a plurality of pixel electrodes;
a scan line driver circuit which scans the scan lines; and
the driver circuit as defined in claim 6 which drives the data lines.

11. An electro-optical device comprising:
a plurality of scan lines;
a plurality of data lines;
a plurality of pixel electrodes;
a scan line driver circuit which scans the scan lines; and
the driver circuit as defined in claim 7 which drives the data lines.

12. An electro-optical device comprising:
a plurality of scan lines;
a plurality of data lines;
a plurality of pixel electrodes;
a scan line driver circuit which scans the scan lines; and
the driver circuit as defined in claim 8 which drives the data lines.

* * * * *